United States Patent [19]

Canino

[11] 3,894,180

[45] July 8, 1975

[54] HEAD HEIGHT CONTROL SYSTEM

[75] Inventor: Lawrence S. Canino, Los Angeles, Calif.

[73] Assignee: MCA Disco-Vision, Inc., Universal City, Calif.

[22] Filed: Nov. 5, 1973

[21] Appl. No.: 413,165

[52] U.S. Cl..... 178/6.6 R; 178/6.7 A; 179/100.3 V; 360/102; 360/103

[51] Int. Cl... G11b 7/12; G11b 15/64; G11b 21/20

[58] Field of Search..................... 360/75, 102, 103; 178/6.6 R, 6.6 A, 6.7 A; 179/100.3 V, 100.41 L

[56] References Cited

UNITED STATES PATENTS 3,123,677 3/1964 Lauxen et al. .................... 360/103

3,132,328 5/1964 Taylor.............................. 360/103

*Primary Examiner*—Bernard Konick
*Assistant Examiner*—R. S. Tupper
*Attorney, Agent, or Firm*—Marvin H. Kleinberg

[57] ABSTRACT

A transducer assembly hydrodynamically supported above a surface has its spacing from the surface maintained at predetermined values by a fluid control regulator which responds to changes in fluid pressure resulting from spacing changes to vary fluid flow through a conduit carried by the transducer assembly so as to thereby correct any variations from the predetermined spacing. The regulator includes a pair of diaphragms which, through a common coupling controls the pressure applied to the conduit, permitting a correcting change in flow through the transducer carried conduit.

22 Claims, 1 Drawing Figure

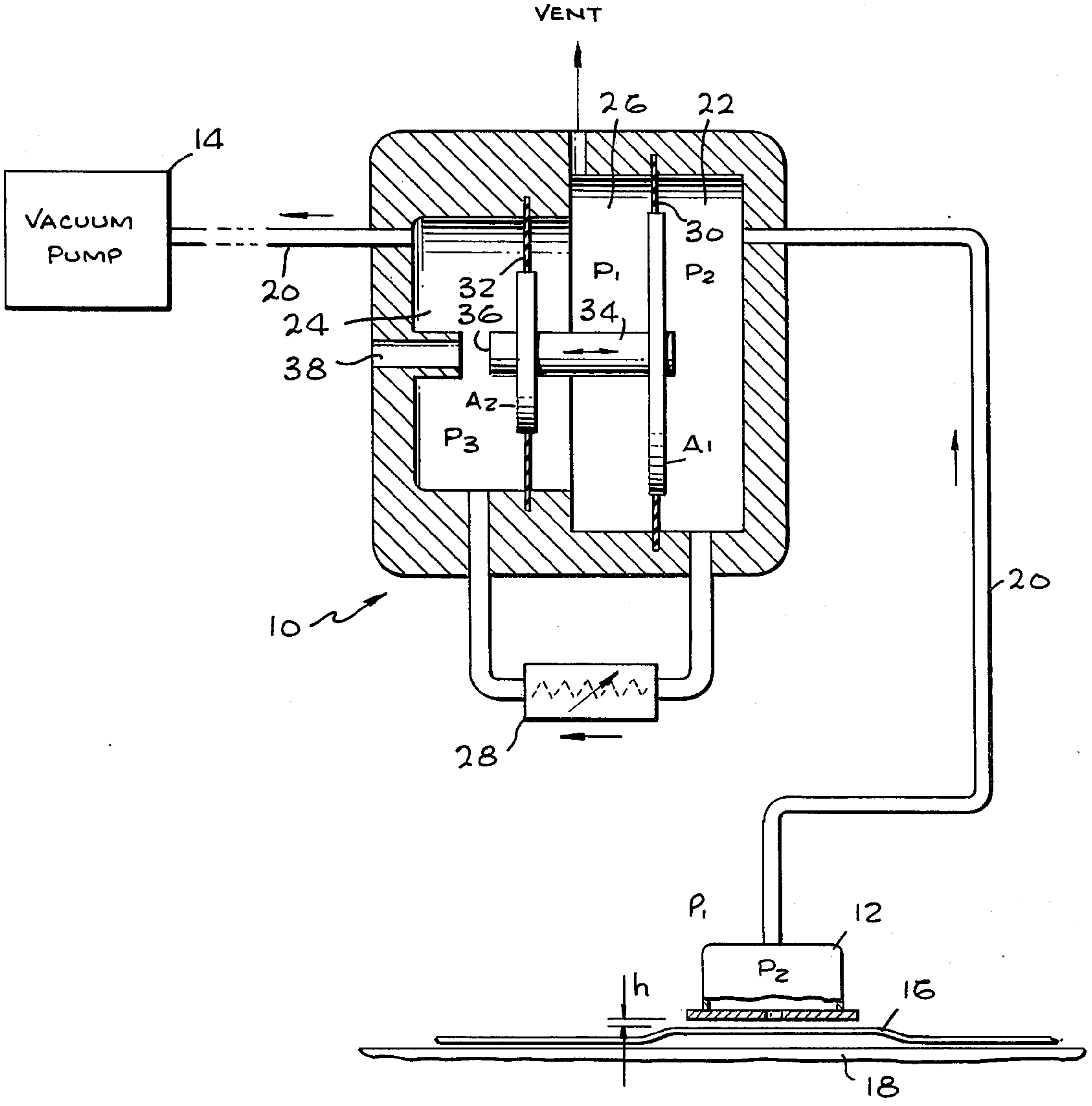
VENT
26
22
14
VACUUM PUMP
30
20
32
P1
P2
24
36
34
38
A2
P3
A1
10
20
28
P1
12
P2
h
16
18

HEAD HEIGHT CONTROL SYSTEM

CROSS-REFERENCES TO RELATED APPLICATIONS

"Video Disc Player" by James E. Elliott, Ser. No. 314,082, filed Dec. 11. 1972; "Fluid Cushion Turntable for Video Disc Player" by Manfred H. Jarsen, Ser. No. 402,634, filed Oct. 1, 1973; and "Vacuum Reading Head" by Manfred H. Jarsen Ser. No. 402,635, filed Oct. 1, 1973.

BACKGROUND OF THE INVENTION

1. Field of the Invention

The present invention relates to a fluid pressure servo system and, more particularly, to a system designed to maintain a constant spacing as between a member and a surface, separated by a hydrodynamic fluid.

2. Description of the Prior Art

In the development of a video disc system including a player for video discs, information is recorded on a disc as a series of irregularities, each approximately 1 micron in width, arranged in a line with adjacent lines or tracks being spaced apart by approximately 2 microns, center to center. As noted in the above-identified Elliott application, the problem of optically resolving irregularities of these dimensions requires that the focus of the optical system by maintained constant within a micron.

This constraint has led to the development of a relatively rigid video disc which operates in conjunction with a reading head on a hydrodynamic fluid bearing. The height of the head is then determined by the geometry of the hydrodynamic bearing and whatever preload is applied to the head.

As an alternative embodiment, as noted in the Jarsen applications, supra, a relatively flexible disc is employed with a relatively permanent head. Through the use of a vacuum system, hydrodynamic fluid is evacuated through the head, creating a pressure differential which tends to draw the disc to the head.

Inasmuch as the hydrodynamic bearing created by the relative motion of disc and head is, to a great extent, a function of relative velocity, and since, with a flexible disc, it is possible that the spacing between disc and head may vary, it has beem deemed desirable to maintain the spacing between head and disc at some constant value to avoid defocusing of the reading beam with the attendant loss of resolution of the information recorded on the disc.

While it is possible to create a controller which will modify the vacuum or pressure applied to the head as a function of radial location of the head, this approach is unable to accommodate local imperfections, perturbations and irregularities and can only accommodate the gradual change in hydrodynamic pressure as a function of the change in relative velocity at different radial positions.

SUMMARY OF THE INVENTION

According to the present invention, a novel pressure regulator has been discovered which immediately responds to changes in the separation between head and disc and modifies the fluid pressure applied to the head. The forces acting between the head and the disc are thus modified in a way to restore the desired spacing.

A regulator is provided including a first chamber, which is coupled to the reading head, and a second, smaller chamber, which in a preferred embodiment is coupled to a vacuum pump. A third chamber, between the first and second chambers, is vented to be ambient.

An armature is coupled to a pair of dissimilar sized diaphragms which define the three chambers. The first chamber and second chamber are connected by a variable restrictor that is adjusted to exhibit the same resistance to air flow as the head itself.

A control vent is positioned in the second chamber to communicate the ambient to the interior of the second chamber. The control vent is adjacent the armature and is adapted to be blocked by the armature at an extreme of diaphragm movement caused by an appropriate pressure differential as between the first and second chambers.

Assuming the following relationships and assuming that operation is restricted to that condition wherein the hydrodynamic fluid may be deemed incompressible:

$Q$ = flow rate of fluid (air)
$K$ = constant
$\mu$ = viscosity of fluid (air)
$P_1$ = ambient pressure
$P_2$ = pressure within the head
$P_3$ = pressure in the second chamber
$R_H$ = resistance to air flow of the head
$h$ = distance of head from surface.

Thus, at the head the flow rate Q is:

$$Q = \frac{(P_1 \overset{h^3}{-} P_2)}{K\mu} \qquad \text{Equation (1)}$$

$$R_H = \frac{P_1 - P_2}{Q} = \frac{K\mu}{h_3} \qquad \text{Equation (2)}$$

If the head height is to be maintained constant, then it is necessary to hold ($P_1$—$P_2$/Q) as a constant.

Assuming that operation is restricted to that condition wherein the hydrodynamic fluid may be deemed incompressible, then the spacing of the head from the disc is a function of the difference in pressure between the interior of the head ($P_2$) and the ambient pressure ($P_1$) urging the disc against the head and the flow Q. Other forces acting upon the disc, such as the radial forces which may affect the flexibility of the disc, generally are included among constants of the system.

The pressure at the interior of the head is a function of the fluid flow rate. The flow rate, in turn, can be controlled to a great extent by the pressure differential between the second chamber ($P_3$) and the first chamber ($P_1$). This differential, in turn, is controlled by the position of the armature which is, in effect, a valve on the control vent.

It will then be seen that the height of the head will be maintained at a reasonably constant value as the regulator diaphragm armature shifts back and forth in response to head pressure changes caused by variations in head height varying the amount of air admitted through the vent in the second chamber.

Alternatively, the regulator of the present invention can function equally well in maintaining head height in a hydrodynamic bearing without a vacuum head such as is disclosed in the earlier Elliott application, supra. If a pressure pump is substituted for the vacuum pump and all other connections remain the same, it is clear that the regulator would then function as a pressure regulator to maintain the head height constant in a hydrodynamic or "flying head" application.

The novel features which are believed to be characteristic of the invention, both as to organization and method of operation, together with further objects and advantages thereof, will be better understood from the following description considered in connection with the accompanying drawing in which the preferred embodiment of the invention is illustrated by way of example. It is to be expressly understood, however, that the drawing is for the purpose of illustration and description only and is not intended as a definition of the limits of the invention.

DESCRIPTION OF THE PREFERRED EMBODIMENT

Turning to the figure, there is shown in cross-section a head height regulator 10 which is coupled to a head assembly 12 and a vacuum source 14, in this embodiment a pump. The head 12, as shown, is fixedly mounted relative to a flexible disc 16 which rotates with a back plate turntable 18. Preferably, the turntable is of the type disclosed in the copending application of Manfred H. Jarsen filed Oct. 1, 1973, Ser. No. 402,634, entitled "Fluid Cushion Turntable for Video Disc Player."

The head height regulator unit 10 is coupled to the transducer head assembly 12 through a flexible conduit 20 and, through A similar conduit, is coupled to the vacuum pump 14. The assembly 12 is subdivided into three integral chambers of varying volumes. A first chamber 22 communicates with the transducer assembly 12, a second chamber 24 communicates with the vacuum pump 14, and a third or intermediate chamber 26 communicates with the ambient environment.

The first and second chambers are connected together through a variable restrictor 28 which controls the flow of air as between the two chambers. A first diaphragm 30 isolates the first chamber 22 from the third chamber 26, and a second diaphragm 32 isolates the second chamber 24 from the third chamber 26.

The diaphragms 30, 32 are joined by a common armature member 34, which includes a valve surface 36 within the second chamber 24. A vent 38 to the outside environment is adapted to be occluded by the valve surface 36 within the second chamber 24.

For the purposes of explanation, it will be assumed that the outside ambient pressure is considered to be $P_1$, and the pressure within the transducer head 12 may be considered $P_2$. The pressure (or vacuum) created by the vacuum pump 14 in the second chamber 24 may be represented by $P_3$. In order to relate the relative areas of the chambers, the area of the first diaphragm 30 will be represented by $A_1$, and the area of the second diaphragm 32 is represented by $A_2$.

If the distance of the head from the surface is to be maintained constant, then it can be seen from an examination of Equation (2), above, that the ratio of the pressure differential $(P_1-P_2)$ divided by the flow rate Q should remain a constant.

According to the preferred embodiment of the present invention, resistance to fluid flow of the restrictor 28 is adjusted to have a similar flow resistance characteristic as the transducer head 12. This may be done by determining the flow rate through the transducer head and conduit 20 for a given pressure differential and setting the restrictor 28 to permit a predetermined proportional rate for the same pressure differential. When this has been accomplished, the resistance of the restrictor 28, $R_d$ would be proportional to the resistance of the transducer head, $R_H$ and its conduit 20. The flow Q through the restrictor 28 can be expressed:

$$Q = \frac{P_2-P_3}{}, \; P_2-P_3 = QR_d \qquad \text{Equation (4)}$$

Within the regulator unit 10, the force balance on the armature 34, as determined from the areas of the diaphragms $A_1$ and $A_2$, can be expressed as follows:

$$(P_1-P_3)A_2 = (P_1-P_2)A_1 \qquad \text{Equation (5)}$$

By adding a term $P_2A_2$ to both sides, the expression can be rewritten:

$$(P_2-P_3)A_2 = (P_1-P_2)\,(A_1-A_2) \qquad \text{Equation (6)}$$

Substituting from Equation (4), the expression can be restated:

$$QR_dA_2 = (P_1\ P_2)\,(A_1-A_2) \qquad \text{Equation (7)}$$

This expression can also be written:

$$\frac{P_1-P_2}{Q} = \frac{R_dA_2}{G1A_1-A_2} \qquad \text{Equation (8)}$$

By substituting from Equation (2);

$$\frac{R_dA_2}{A_1-A_2} = \frac{K\mu}{h^3} \qquad \text{Equation (9)}$$

Or, expressed differently:

$$h^3 = \frac{K\mu(A_1-A_2)}{R_dA_2} \qquad \text{Equation (10)}$$

Since this will be a constant for any particular configuration of the assembly 10, the height, $h$, of the transducer head 12 should remain constant, by compensating differences in pressure with offsetting and compensating differences in the flow rate through the head 12.

Since the flow, Q, varies as the third power of the height, $h$, small changes in head to disc spacing are accompanied by substantial changes in pressure $P_2$ and flow Q. The pressure $P_3$ in the second chamber 24 reaches some intermediate magnitude, between the vacuum source magnitude at the pump 12 and the pressure $P_2$ at the head.

The vent 38 tends to maintain the pressure $P_3$, providing a source of fluid to the pump 14. However, when the pressure $P_2$ changes, the spacing of the valve surface 36 relative to the vent 38 can cause the pressure $P_3$ to change quickly.

That is, if the pressure $P_2$ drops because h has decreased, the armature is moved to the right, further opening the vent 38, increasing the effect of the ambient pressure $P_1$ upon the second chamber 24, which raises the pressure $P_3$. This reduces the differential $P_2—P_3$, causing a drop in the rate of flow through the restriction 28, therefore causing the pressure $P_2$ to increase. Increasing $P_2$ restores the pressure to its former value, thereby correcting the height, $h$, of the head 12.

If $P_2$ increases as a result of $h$ increasing, the armature tends to move to the left, thus closing the vent 38, resulting in a drop in the pressure $P_3$. A greater pressure differential across the restriction 28 increases the rate of flow of fluid, which in turn reduces the pressure $P_2$, therefore decreasing the value of $h$.

It is clear that the relative values of $P_2$ and $P_3$ are arbitrary and that the regulator would be equally effective in maintaining head height in a positive pressure system, as well.

The present invention can usefully be employed in any hydrodynamic system wherein a predetermined spacing must be maintained between a "head" and a cooperating surface.

As is apparent, the conduit 28 may be directly connected to conduit 20, if desired, with the first regulator chamber communicating with the junction of the two conduits in this alternative fashion. It will also be recognized that a bias point or offset for the operation of the diaphragms 30 and 32 and element 36 can be set as desired, either by allowing the diaphragms 30 or 32 to have a predetermined spring preload against armature 34, as may be used in the embodiment shown in the figure, or alternatively by using a separate preloading spring to push against armature 34. Such adjustment of a bias point for the operation of the diaphragms permits better fitting of the compensation characteristics of regulator 10 to the flow versus pressure differential characteristic of transducer 12 and its associated conduit 20. Other variations and modifications will, of course, occur to those skilled in the art without departing from the principles of the present invention. Accordingly, the scope of the invention should be limited only by the claims appended hereto.

What is claimed as new is:

1. For use with an information handling system in which a transducer head assembly and a surface of an information bearing medium are immersed in fluid and are relatively movable with respect to each other to form a dynamic fluid bearing therebetween, a combination for maintaining a predetermined spacing between the transducer head assembly and the surface of the information bearing medium, said combination comprising:

a first fluid flow restricting conduit, said first conduit having predetermined fluid flow resistance characteristics and having first and second end portions, said conduit having its first end portion carried by the transducer head assembly and communicating with fluid in the spacing between the transducer head assembly and the surface of the information bearing medium;

a source of fluid at a variable controllable pressure;

a second fluid flow restricting conduit having a fluid flow resistance characteristic which has a predetermined relation to the fluid flow resistance characteristic of said first conduit, said second conduit being intercoupled between said source of fluid and the second end portion of said first conduit for series flow of fluid through said first and second conduits to said source; and control means for controlling fluid pressure of said source, said control means being coupled to said first conduit and to said source of fluid and responsive to changes in fluid pressure in first conduit for varying the fluid pressure of said source to vary the fluid flow rate through said first and second conduits, whereby changes in transducer head spacing are automatically corrected by varying flow rate through said first and second conduits in response to the corresponding pressure changes in the first conduit.

2. The combination defined by claim 1 wherein said control means is coupled to said second end portion of said first conduit and is responsive to the fluid pressure therein for varying the flow rate through said first and second conduits.

3. The combination defined by claim 2 wherein said control means includes a first pressure chamber for interconnecting the second end portion of said first conduit with said second conduit, said control means being responsive to changes in fluid pressure within said first pressure chamber for varying the fluid pressure of said source.

4. The combination defined by claim 1 wherein said control means is coupled to the junction of said first and second conduits and is responsive to the fluid pressure thereat for controlling the flow rate through said first and second conduits.

5. The combination defined by claim 1 wherein said first end portion of said first conduit includes a chamber within said transducer head assembly, said chamber communicating with the fluid volume in the spacing between said transducer head assembly and the surface of the information bearing medium.

6. The combination defined by claim 1 wherein said control means is responsive to a pressure difference between the fluid pressure in said first conduit and the fluid pressure of the ambient fluid in which the head assembly is immersed, for controlling the flow rate through said first and second conduits.

7. The combination defined by claim 6 in which said control means varies the fluid pressure of said source to change the flow rate through said first and second conduits in proportion to changes in the pressure difference between ambient fluid and the fluid in said first conduit, to thereby maintain a desired transducer head spacing.

8. The combination defined by claim 6 wherein said control means is additionally responsive to the pressure differential between the fluid pressure of said source and the fluid pressure of fluid in said first circuit, for controlling the fluid pressure of said source.

9. The combination defined by claim 6 wherein said control means includes a control valve for controlling the fluid pressure of said source, said control valve having a movable member, the fluid pressure being variable in accordance with the position of said movable member, said movable member being movable in response to force exerted thereon by first force exerting means, said first force exerting means being coupled to both the ambient fluid in which the transducer head assembly is immersed and to the fluid at said second end portion of said first conduit and being responsive to the pressure differential therebetween for exerting a corresponding force upon said movable member to change the position thereof.

10. The combination defined by claim 9 wherein said first force exerting means includes a first pressure chamber coupled to said second end portion of said conduit and a second pressure chamber vented to ambient fluid, said first pressure exerting means including a diaphragm separating the first and second chambers and responsive to the pressure differential therebetween for exerting force upon said movable member.

11. The combination defined by claim 9 which includes a second force exerting means coupled to said movable member, said second force exerting means including a chamber vented to ambient fluid in which said transducer assembly is immersed, and a diaphragm, separating said chamber from said source, the diaphragm being responsive to the pressure differential between the ambient fluid and said source for exerting force upon the movable member to control the position thereof.

12. The combination defined by claim 1 wherein said second conduit includes a variable restrictor and is settable to have a fluid flow resistance characteristic similar to the fluid flow resistance characteristic of said first conduit.

13. The combination defined by claim 1 wherein said second fluid flow restricting conduit includes a variable restrictor and is settable to have a fluid flow resistance characteristic which is substantially the same as the fluid flow resistance characteristic of said first conduit.

14. The combination defined by claim 1 in which the pressure of fluid from said source is lower than the pressure of the ambient fluid in which said transducer head assembly is immersed, said source vacuuming fluid thereto in series flow through said first and second conduits.

15. The combination defined by claim 1 in which said surface of said information bearing medium is a flexible sheet which is bendable to have a variable spacing with respect to said transducer head assembly.

16. The combination defined by claim 15 in which said transducer head and said surface of said information bearing medium form an hydrodynamic bearing therebetween in which the pressure of fluid from said source is lower than the pressure of the ambient fluid in which said transducer head assembly is immersed, said source vacuuming fluid thereto through said first and second conduits to draw the immediately opposite portions of the surface of said information bearing medium into close spacing with said transducer head assembly.

17. The combination defined by claim 1 wherein said control means is coupled to said second end portion of said first conduit and to said source and is responsive to the fluid pressure difference therebetween for varying the flow rate through said first and second conduits.

18. In an information handling system, the combination comprising relatively movable first and second opposing surfaces of a transducer head and a recording medium, said first and second surfaces being immersed in fluid and forming a hydrodynamic bearing with respect to each other;

a first fluid flow restricting conduit, said first conduit having predetermined fluid flow resistance characteristics and having first and second end portions, said conduit having its first end portion carried by said first surface and communicating with fluid in the spacing between said first surface and said second surface;

a source of fluid at a variable controllable pressure;

a second fluid flow restricting conduit having a fluid flow resistance characteristic which has a predetermined relation to the fluid flow resistance characteristic of said first conduit, said second conduit being intercoupled between said source of fluid and the second end portion of said first conduit for series flow of fluid through said first and second conduits to said source; and control means for controlling fluid pressure of said source, said control means being coupled to said first conduit and to said source and responsive to changes in fluid pressure in said first conduit for varying the fluid pressure of said source to vary the flow rate through said first and second conduits, whereby changes in spacing between the first and second surfaces are automatically corrected by varying flow rate through said first and second conduits in response to the corresponding pressure changes in the first conduit.

19. The combination defined by claim 18 in which the pressure of fluid from said source is lower than the ambient pressure of the fluid in which said first and second surfaces are immersed, said source vacuuming fluid thereto in series flow through said first and second conduit.

20. The combination defined by claim 19 in which said second surface is a face of an intformation bearing medium and said first surface is a face of a transducer head assembly.

21. The combination defined by claim 20 in which said second surface is a face of a flexible information bearing sheet which is bendable to have a variable spacing with respect to the transducer head assembly, said source vacuuming fluid thereto through said first and second conduits to draw the immediately opposite portion of said second surface into close spacing with said transducer head assembly.

22. In an information handling system, the combination comprising:

an information carrying medium having an inormation bearing surface;

an information transducer head assembly having a surface thereof positioned adjacent said information bearing surface, said transducer head assembly and said information bearing medium being relatively movable with respect to each other and being immersed in fluid, said surface of said transducer head assembly and said information bearing surface forming a hydrodynamic bearing with respect to each other;

an apparatus for maintaining a constant separation distance betweeen said transducer head assembly and said information bearing surface, said apparatus comprising:

a first fluid flow restricting conduit, said first conduit having predetermined fluid flow resistance characteristics and having first and second end portions, said conduit having its first end portion carried by the transducer head assembly and communicating with fluid in the spacing between said transducer head assembly and said information bearing surface;

a regulator body having first, second and third chambers and including a first diaphragm separating said first and second chamber and a second diaphragm separating said second and third chamber, said first chamber being vented to a source of fluid having a pressure relatively lower than the fluid in which said transducer head assembly and said information bearing surface are immersed, and said second chamber being vented to the fluid in which said transducer head assembly and said information bearing surface is immersed;

a second fluid flow restricting conduit having a fluid flow resistance characteristic which has a predetermined relation to the fluid flow resistance characteristic of said first conduit, said second conduit being intercoupled between said first chamber and said second end portion of said first conduit for series flow of fluid through said first and second conduits to said first chamber;

said third chamber being coupled to the junction of said first and second conduits, said first diaphragm being movable in response to pressure differential between said first and second chamber and said second diaphragm being movable in response to pressure differential between said second and third chambers, and a control means for controlling fluid pressure in said first chamber, said control means interconnecting said first and second diaphragms for common movement thereof and responsive to movement thereof for varying the fluid pressure in said first chamber, whereby changes in spacing between said transducer head assembly and said information bearing surface are automatically corrected by varying the flow rate through said first and second conduits to said first chamber.

* * * * *

UNITED STATES PATENT OFFICE
CERTIFICATE OF CORRECTION

Patent No. 3,894,180 Dated July 8, 1975

Inventor(s) LAWRENCE S. CANINO

It is certified that error appears in the above-identified patent and that said Letters Patent are hereby corrected as shown below:

Column 1, line 27, cancel "by" and insert - - be - - ;

Column 2, equation (1), that portion of the equation reading $$Q = \frac{(P_1 \overset{h^3}{-} P_2}{K\mu}$$ should read $$Q = \frac{h^3(P_1 - P_2)}{K\mu}$$

Column 2, equation (2), that portion of the equation reading $$\frac{K\mu}{h_3}$$ should read $$\frac{K\mu}{h^3}$$

Column 2, line 38, that portion of the equation reading $(P_1 - P_2 /Q)$ should read $(P_1 - P_2) /Q$ Column 4, line 4, after the word "head" insert - - 12 - - ;

Column 4, equation 4, that portion of the equation reading $$Q = \frac{P_2 - P_3}{\phantom{R_d}} ,$$ should read $$Q = \frac{P_2 - P_3}{R_d} ,$$

UNITED STATES PATENT OFFICE

CERTIFICATE OF CORRECTION

Patent No. 3,894,180 Dated July 8, 1975

Inventor(s) LAWRENCE S. CANINO

It is certified that error appears in the above-identified patent and that said Letters Patent are hereby corrected as shown below:

Column 4, equation 8, that portion of the equation reading $$\frac{P_1-P_2}{Q} = \frac{R_dA_2}{G1A} \quad {}_1{-A_2}$$

should read $$\frac{P_1-P_2}{Q} = \frac{R_dA_2}{A_1-A_2}$$

Column 6, line 54, cancel "circuit" and insert - - conduit - - ;

Column 8, line 32 (Claim 20.) cancel "intformation" and insert - - information - - ;

Column 8, line 45,(Claim 22.) cancel "inorma" and replace with - - informa - - .

Signed and Sealed this

Twenty-first Day of September 1976

[SEAL]

*Attest:*

RUTH C. MASON
*Attesting Officer*

C. MARSHALL DANN
*Commissioner of Patents and Trademarks*